United States Patent
Olesen et al.

(10) Patent No.: US 9,878,400 B1
(45) Date of Patent: Jan. 30, 2018

(54) DEVICE FOR CONTROLLING THE DIRECTION OF A LASER BEAM

(71) Applicant: Gentex Corporation, Zeeland, MI (US)

(72) Inventors: Niels A. Olesen, Zeeland, MI (US); David A. Bender, Holland, MI (US); Kurtis L. Geerlings, Zeeland, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 450 days.

(21) Appl. No.: 14/579,923

(22) Filed: Dec. 22, 2014

Related U.S. Application Data

(60) Provisional application No. 61/919,693, filed on Dec. 20, 2013.

(51) Int. Cl.
*B23K 26/082* (2014.01)
*B23K 26/38* (2014.01)

(52) U.S. Cl.
CPC .................. *B23K 26/38* (2013.01)

(58) Field of Classification Search
CPC .... B23K 26/36; B23K 26/082; B23K 26/083; B23K 26/064; B23K 26/0643; B23K 26/0652
USPC ............ 219/121.67–121.72, 121.78, 121.68, 219/121.69, 121.79
See application file for complete search history.

(56) References Cited

U.S. PATENT DOCUMENTS

| | | | | |
|---|---|---|---|---|
| 4,694,139 A | * | 9/1987 | Roder | B23K 26/0884 219/121.67 |
| 5,856,648 A | * | 1/1999 | Frauchiger | B23K 26/0823 219/121.61 |
| 6,355,907 B1 | * | 3/2002 | Kuehnle | B23K 26/06 219/121.7 |
| 8,842,358 B2 | | 9/2014 | Bareman et al. | |
| 2001/0023163 A1 | * | 9/2001 | Kinbara | B23K 26/0075 451/28 |

* cited by examiner

*Primary Examiner* — Samuel M Heinrich
(74) *Attorney, Agent, or Firm* — Foley & Lardner LLP; Bradley D. Johnson

(57) ABSTRACT

A laser system is configured to form laser-induced channels in a substrate at a plurality of spaced apart locations along a process path. The laser system includes a laser delivery assembly that receives the laser beam along a receiving axis and directs the laser beam toward the substrate along an impingement axis that forms an oblique angle with a surface of the substrate. The substrate can be divided into separate first and second portions along a separation surface having a draft angle, thereby facilitating substrate division with a zero-kerf process.

20 Claims, 4 Drawing Sheets

DEVICE FOR CONTROLLING THE DIRECTION OF A LASER BEAM

TECHNICAL FIELD

The present disclosure generally relates to manufacturing processes that use lasers and, more particularly, to components that control the direction of a laser beam during such processes.

BACKGROUND

A substrate material can be separated into two or more pieces by forming a plurality of laser induced channels along a process path located along an intended line of separation, as taught by Bareman et al. in U.S. Pat. No. 8,842,358. A laser induced channel edge can be formed upon substrate separation and can have a relatively smooth surface without the need for post-processing operations such as grinding. Unlike conventional cutting techniques, substrate separation via laser-induced channels may be a zero or near-zero kerf process which, while offering a high level of precision, can present new processing issues.

SUMMARY

In accordance with one or more embodiments, a laser system is configured to form laser-induced channels in a substrate at a plurality of spaced apart locations along a process path. The laser system includes a laser that produces a laser beam, as well as a laser delivery assembly comprising a base and an optical assembly. The optical assembly moves relative to the base, and the base supports the substrate. The optical assembly receives the laser beam along a receiving axis and directs the laser beam toward the substrate along an impingement axis that forms an oblique angle with a surface of the substrate. A separation surface having a draft angle is formed along the process path when the substrate is separated into first and second portions defined on opposite sides of the process path.

In accordance with one or more embodiments, a method of dividing a substrate into separate first and second portions includes the steps of directing a laser beam from a moving optical assembly toward the substrate and impinging a surface of the substrate with the laser beam at an oblique angle. The laser beam is a pulsed laser beam configured to form a plurality of spaced-apart laser-induced channels in the substrate along a process path, and the first portion and the second portion are on opposite sides of the process path. The method also includes the step of separating the substrate along the plurality of spaced-apart laser-induced channels, thereby forming separation surfaces having a draft angle along edges of the separated first and second portions.

BRIEF DESCRIPTION OF THE DRAWINGS

Illustrative embodiments of the invention will hereinafter be described in conjunction with the appended drawings, wherein like designations denote like elements, and wherein.

DETAILED DESCRIPTION OF ILLUSTRATIVE EMBODIMENTS

Figure 1:
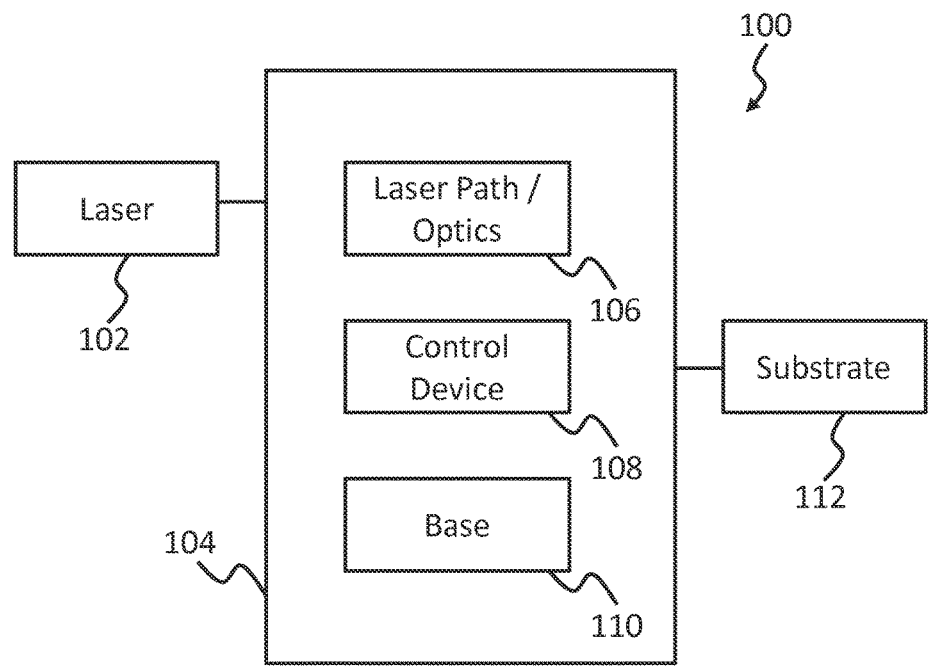
FIG. 1 is a schematic diagram of an illustrative laser system that includes a laser control device.

With reference to FIG. 1, a laser system 100 is diagrammatically illustrated. The illustrated embodiment includes a laser 102 in optical communication with a laser delivery assembly 104. The laser delivery assembly 104 may include a laser path or optics 106, a laser control device 108, and a base 110, as shown, and is configured to direct a beam of laser light (i.e., a laser beam) emitted by the laser 102 toward a substrate 112 that is to be processed.

The laser control device 108 generally operates to change, control, monitor and/or determine the relative location and/or orientation of a portion of the laser beam that impinges the substrate 112 and may do so via appropriate direction of the laser beam and/or the substrate 112 relative to a Cartesian or other coordinate system and/or about various axes. For instance, the control device 108 may include servo motors, controllers, sensors, optical elements, and other components configured to change the location and/or orientation at which the laser beam impinges the substrate 112. The control device 108 may include its own optical elements separate from the laser path or optics 106, which may be arranged between the laser 102 and the control device.

One process parameter of the laser system 100 that is influenced by the control device 108 is the speed or velocity at which the laser beam moves along a process path 118 defined along the substrate 112. In some embodiments, the control device 108 is configured to direct the laser beam along the substrate 112 at a constant speed. More particularly, with reference to FIG. 2, the control device 108 (only a portion of which is illustrated) can be configured to direct the laser beam 114 so that a laser spot 116 moves along the process path 118 at a constant speed. The laser spot 116 is defined where the laser beam 114 impinges a surface 120 of the substrate 112. Where the substrate 112 is transparent to the particular wavelength of laser light generated by the laser 102, the impingement surface 120 may be considered an entry surface. As used herein, the speed of the laser spot 116 is the magnitude of the velocity of the laser spot 116 as measured along the process path 118 in the instant direction of movement.

Figure 2:
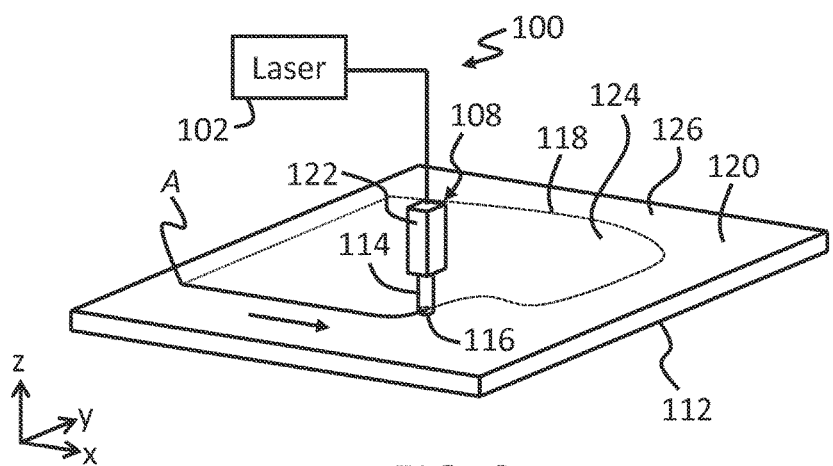
FIG. 2. is a perspective view of an illustrative laser system processing a substrate along a process path.

In the example illustrated in FIG. 2, the processed portion of the process path 118 is indicated by a solid line, and the unprocessed portion is indicated by a dotted line. The process starting point is indicated at point A, and the starting direction of movement is in the x-direction. Beginning at point A, with the laser spot 116 moving at a constant speed along the process path 118, the laser spot 116 moves at the same constant velocity in the x-direction and at a different constant velocity (i.e., zero) in the y-direction. Where the process path 118 of FIG. 2 curves toward the y-direction, the velocity of the laser spot 116 decreases and increases in the respective x- and y-directions while the speed remains constant along the process path.

Directing the laser beam 114 such that the laser spot 116 moves at a constant speed along the process path 118 is advantageous when the laser system 100 is configured to deliver the laser beam to the substrate 112 in pulses at a designated frequency so that the locations at which the laser affects the substrate material are evenly spaced along the process path 118. For instance, with the laser system 100 configured at a pulse frequency of 100 kHz, movement of the laser spot 116 along the process path 118 at a constant speed of 500 mm/sec results in laser pulses delivered to the substrate 112 every 5 µm along the process path 118. Other exemplary speeds are 250 mm/sec and 125 mm/sec, and other exemplary laser pulse frequencies are 200 kHz and 400 kHz. Other laser spot speeds and pulse frequencies are possible, and each can affect the spacing of laser-induced channels or other laser-affected material portions along the process path. It is also possible to vary the speed of the laser spot 116 along the process path 118 and to change the laser pulse frequency along the process path.

In embodiments where the substrate 112 is transparent to the particular wavelength of the laser light from the laser 102 and it is desired to form a series of spaced-apart laser-induced channels through or within the thickness of the substrate along the process path 118, controlling the spacing between adjacent laser-induced channels may be particularly useful. In particular, it has been found that the amount of spacing between adjacent laser-induced channels can affect not only the ability to separate one portion of the substrate from another portion after processing, but also the ability to form successive laser-induced channels at all. It has also been found that the uniformity of the spacing between adjacent laser-induced channels can affect laser-induced channel formation and substrate separation. While the speed of movement of the cutting tool in other cutting techniques or material separation processes is relatively inconsequential, the speed of movement of the laser spot along the substrate, the uniformity of the speed of movement of the laser spot along the substrate, and the control of the speed of movement of the laser spot along the substrate are identified herein as process parameters that may have noticeable effects where laser-induced channels are formed in the substrate. In some cases, these parameters may be considered to have significant or critical effects on the process and resulting product.

In the laser system 100 depicted in FIG. 2, the laser control device 108 includes a tool portion 122 through or along which the laser beam 114 travels on its way from the laser 102 to the substrate 112. The control device 108 may include other non-illustrated components as well, such as a structural portion, a motor portion, and/or other components. The tool portion 122 includes one or more optical elements and may thus also be referred to as an optical assembly. Each optical element is configured to receive the laser beam at one side and emit the laser beam at another side with an altered direction, size, shape, energy density, energy distribution, or other characteristic. Some examples of optical elements include mirrors, reflectors, lenses, magnifiers, diffusers, prisms, apertures and waveplates, such as a quarter waveplate or half waveplate. In some cases, an optical element can provide multiple beam-changing functions. For example, a concave mirror may reflect or change the direction of the laser beam while simultaneously focusing the beam.

The laser system 100 can be configured to deliver the laser beam 114 to the substrate 112 at an angle of incidence. The angle of incidence is the angle between the central axis of the laser beam 114 and a surface normal of the impingement surface 120. For example, where the laser beam 114 impinges the substrate surface 120 at a right angle, as shown in FIG. 2, the angle of incidence is zero. A zero angle of incidence can result in a separation surface (e.g., formed along a series of laser-induced channels) that is normal to the substrate surface 120.

Additionally or alternatively, the laser system 100 can be configured to deliver the laser beam 114 to the substrate 112 at a non-zero angle of incidence—i.e., at an oblique angle. A non-zero angle of incidence can result in a separation surface with a draft angle that can facilitate separation of one portion of the substrate from another. A draft angle is useful to aid separation of first and second substrate portions 124, 126 when the process path 118 lies entirely within the substrate 112 as in FIG. 2 (i.e., when the process path does not extend to the edges of the substrate being processed), particularly when the substrate and/or the circumscribed substrate portion (portion 124 in FIG. 2) are relatively small—less than 25 mm, for example. Such a draft angle is also particularly useful in zero-kerf material separation processes in which no substrate material is removed, so that the shape and dimensions of the outer perimeter of the first portion 124 are identical to those of the inner perimeter of the second portion 126 at the substrate surface 120. Formation of a series of spaced apart laser-induced channels through or within the thickness of the substrate 112 along the process path 118 defines a line of separation along which zero-kerf separation can occur. A non-zero angle of incidence and the resulting draft angle are also useful for other purposes, such as formation of aesthetic and/or functional angled features, chamfers, or bulk material removal prior to grinding, for example.

Where it is desired to provide such a draft angle, the laser system 100 can be configured to direct the laser beam 114 from a final optical element at a non-zero angle of incidence without substantially changing the location of the laser spot if the direction of the beam remained unchanged and at a zero angle of incidence, such that the beam stays approximately within an operating envelope of the optics. In the example of FIG. 2, the optical assembly 122 is the final optic package and can include one or more turning mirrors or other optical elements, actuators, and/or feedback devices that direct the laser beam 114 toward the substrate 112 at a non-zero angle of incidence relative to the impingement surface 120 of the substrate 112 and a centroid of a desired part shape.

Figure 3:
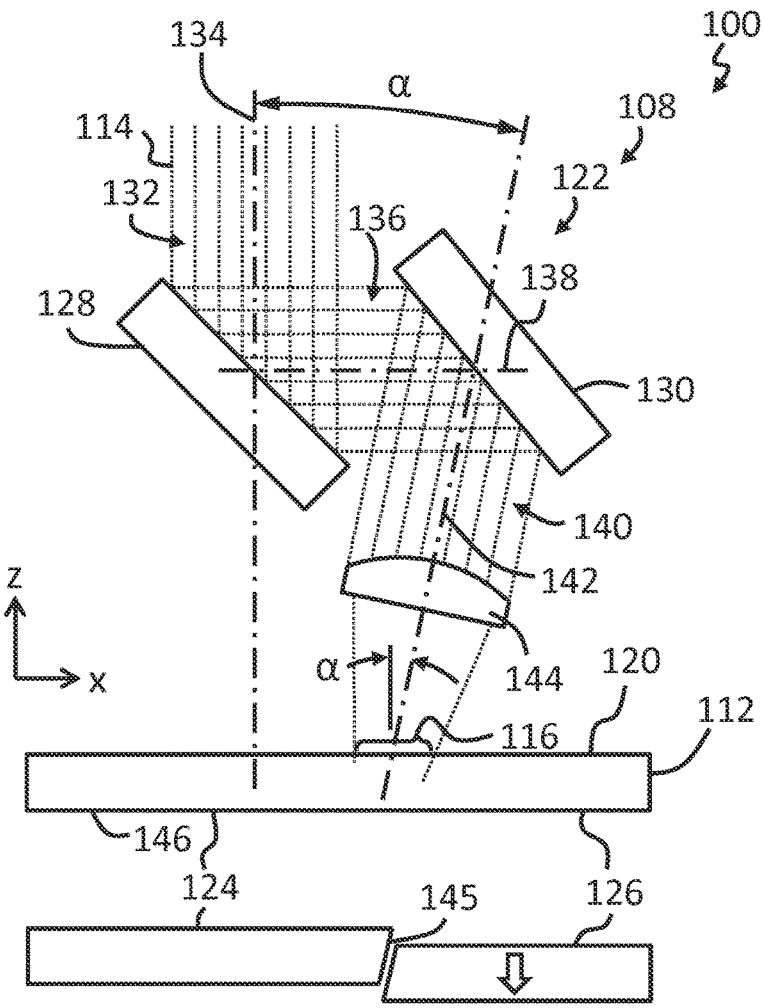
FIG. 3 illustrates an arrangement of optical elements including non-parallel mirrors.
Figure 4:
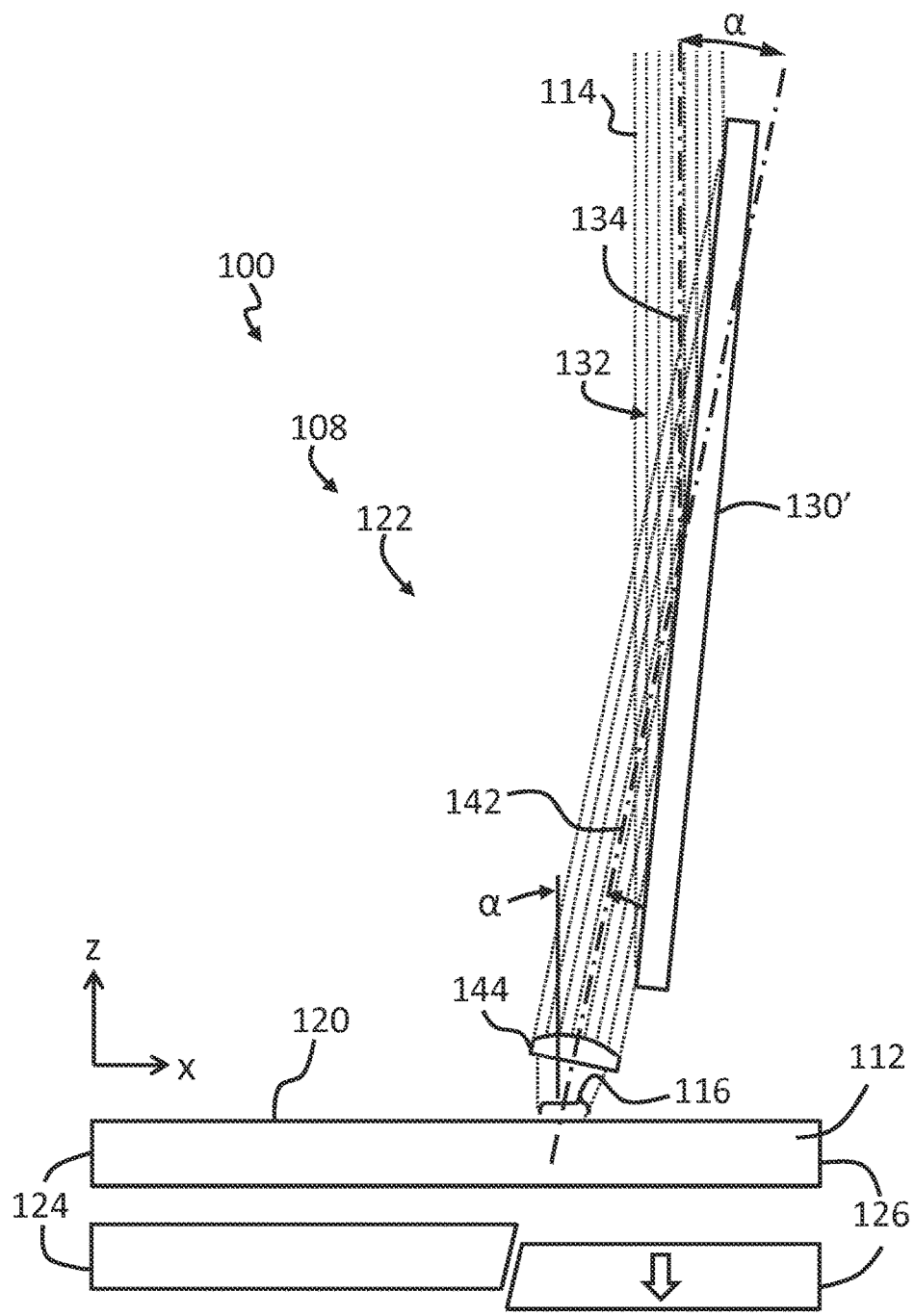
FIG. 4 illustrates an arrangement of optical elements including an elongated mirror.
Figure 5:
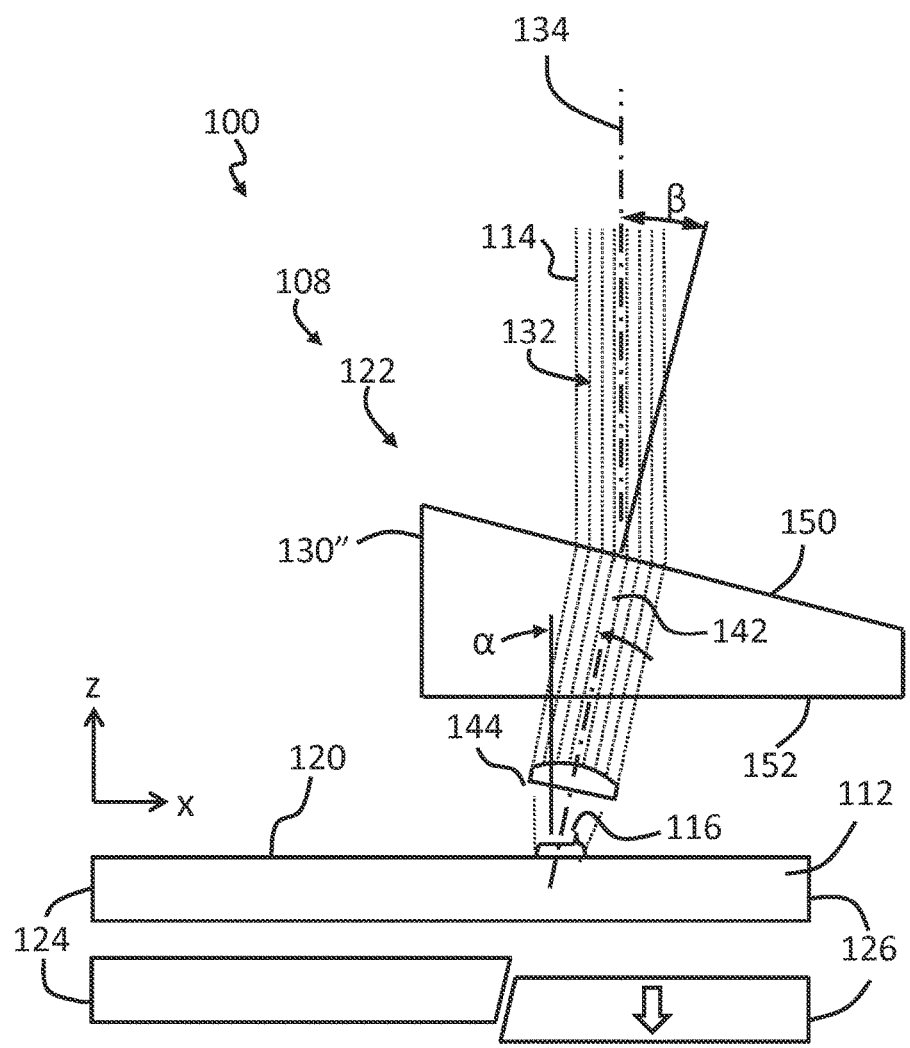
FIG. 5 illustrates an arrangement of optical elements including a prism.

Illustrative examples of optical element configurations are provided in FIGS. 3-5. These and other configurations are useful for impinging the substrate 112 with the laser beam 114 at an oblique angle with respect to the substrate surface 120, with respect to the central axis of the laser beam 114 as it enters or encounters the first optical element of the optical assembly 122 of the control device 108, with respect to a Cartesian or other coordinate system of the laser system 100, and/or with respect to one or more axes of a system reference frame.

FIG. 3 illustrates an example of an arrangement of optical elements 128, 130 configured to direct the laser beam 114 toward the substrate 112 so that it impinges the substrate surface 120 at an oblique angle or a non-zero angle of incidence α. In this example, each of the first and second optical elements 128, 130 is a mirror or other type of reflector. The optical elements 128, 130 may be part of the optical assembly 122 of the laser motion device 108 as shown, or part of some other component or subassembly of the laser system 100. In FIGS. 3-5, the laser beam 114 is depicted schematically as a plurality of individual and representative light rays, each light ray indicated as a dotted line.

A first portion 132 of the laser beam 114 has a first central axis 134 and is received by the first optical element 128. The first axis 134 may be referred to as the receiving axis along which the beam 114 is received by the laser delivery assembly or the optical assembly 122. The first optical element 128 is a turning mirror that changes the direction of the laser beam 114, in this case from the z-direction to the x-direction, and directs the beam toward the second optical element 130. A second portion 136 of the laser beam 114 has a second central axis 138 and is received by the second optical element 130. The second optical element 130 is also a turning mirror that changes the direction of the laser beam 114, in this case from the x-direction toward the substrate 112. A third portion 140 of the laser beam 114 has a third central axis 142 that may determine the angle of incidence α and impinges the surface 120 of the substrate 112 at the laser spot 116 after passing through a focusing lens 144. The third axis 142 may be referred to as the impingement axis along which the beam 114 is directed away from the laser delivery assembly or optical assembly 122. In this case, the lens 144 is symmetric about the third axis 142 and does not change the direction of the beam. The lens may be asymmetric, more than one lens may be included, or the lens may be omitted entirely.

The angle of incidence α is between 0 and 90 degrees. Where it is desired to form a draft angle 145, an angle of incidence α between 1 and 45 degrees may be desirable. In one embodiment, the angle of incidence is in a range from 1 to 25 degrees. In another embodiment, the angle of incidence is in a range from 1 to 15 degrees. In other embodiments, the angle of incidence is in a range from 5 to 15 degrees or 10 to 15 degrees. In the particular example of FIG. 3, the angle of incidence α is the same as the angle between the receiving axis 134 of the first portion 132 of the beam and the impingement axis 142 of the third portion 140 of the beam. It is noted that the oblique angle of incidence α is intentional in the sense that the laser system 100 is configured by control system programming or other means with the intention that the impingement axis 142 intersects the surface 120 of the substrate at a controllable oblique angle, as opposed to unintentional and relatively small oblique angles that might occur by chance due to manufacturing tolerances when the intent is to impinge the substrate surface at a zero angle of incidence. In one example, where an oblique angle of incidence is desired, the angle α is greater than 1 degree. In another example, where the process path is non-linear, the impingement axis 142 is oriented in different, non-parallel directions along different portions of the process path, thus differentiating the controllable oblique angle of incidence α from one that is inadvertently formed in a substrate that is mounted slightly off-axis, where the impingement axis may be slightly oblique but oriented in the same direction with respect to the laser system as a whole along the entire process path.

The laser beam 114 is reflected by each mirror 128, 130 such that the angle between the received portion of the beam and the mirror is equal to the angle between the reflected portion of the beam and the mirror. In the example of FIG. 3, the laser beam impinges the first mirror 128 at a 45-degree angle and thus changes the direction of the beam by 90 degrees. The second mirror 130 changes the direction of the laser beam 114 by (90+α) degrees. The reflective surfaces of the mirrors are thus non-parallel and lie in planes that form an angle of (α/2) degrees with respect to each other. For instance, where it is desired to impinge the substrate surface 120 at an angle of incidence of 12 degrees, the reflective surfaces of the mirrors 128, 130 are tilted with respect to each other by 6 degrees. This is merely one example. Generally, the laser system 100 will include at least one optical element arranged to receive a portion of the laser beam that is aligned with one or more axes of a reference frame (e.g., a Cartesian coordinate system) and to redirect or otherwise change a characteristic of the laser beam so that it is oblique or not aligned with the same one or more axes of the reference frame when it impinges the substrate 112.

In one embodiment, at least one optical element is configured to rotate about an axis normal to the surface 120 of the substrate 112. For instance, in the example of FIG. 3, the first and second optical elements 128, 130 and the lens 144 can be configured, as part of the optical assembly 122 of the control device 108, for rotation about the receiving axis 134. Providing this additional degree of freedom to the movement of the optical element(s) allows direction and orientation of the impingement axis 142 to be varied so that it can intersect the substrate surface 120 at a constant angle of incidence α while moving along a curvilinear process path. This feature is useful to ensure that the draft angle 145 can remain constant or otherwise oriented as desired as the direction of the process path changes along the substrate surface 120. Alternatively, the optical elements 128, 130 and lens 144 may be configured for rotation about an axis normal to the substrate surface that intersects the impingement axis 142 at the substrate surface 120, such that the rotation is about the center of the laser spot 116.

With a non-zero angle of incidence α, two different-sized paths can be traced along respective first and second surfaces 120, 146—entry and exit surfaces where the substrate is transparent to the laser—of the substrate 112, where the impingement axis 142 intersects each of the respective surfaces. In an embodiment with a draft angle, one path is entirely circumscribed by the other, which can be accomplished by rotating the optical elements 128, 130 and lens 144 about the receiving axis 134 while the laser spot 116 is moved along the process path 118 such that the reflective surface of the mirror 130 is always facing toward the first or inner portion 124 of the substrate to be separated or always facing toward the second or outside portion 126 of the substrate to be separated while the process path is traced. More particularly, the optical element 130 may be rotated such that an imaginary plane through the impingement axis 142 (e.g., an imaginary plane through the oblique axis and extending in the y-direction in FIG. 3) remains tangent with the process path during processing.

Figure 3A:
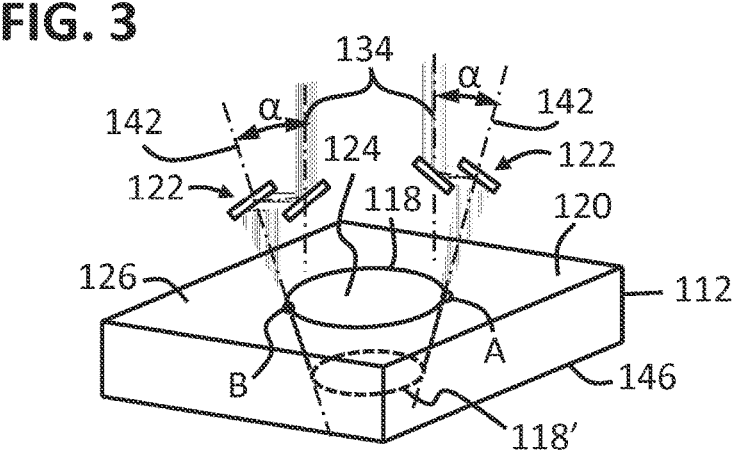
FIG. 3(a) schematically illustrates optical element(s) configured to rotate about an axis along the process path.

FIG. 3(a) schematically illustrates an example of a circular process path 118 defined along the entry surface 120 of the substrate and a corresponding path 118' traced by the impingement axis 142 on the exit surface 146 of the substrate 112. The optical element(s) of the optical assembly 122 rotate about the receiving axis 134 to maintain the angle of incidence α at a constant non-zero value along the entire process path, including at points A and B of the process path, so that the corresponding path 118' at the second surface 146 is also circular and concentric with the process path 118, resulting in a frustoconical inner portion 124 being separable from outer portion 126 along the resulting separation surface formed with a draft angle. The process path 118 and the corresponding path 118' are different sizes, with one lying entirely inside the other. In this example the corresponding path 118' at the second surface of the substrate 112 is smaller than the process path 118, but the opposite could be true in other embodiments.

It is also possible to vary the angle of incidence α along the process path, whether the process path is straight or curved, resulting in a draft angle that varies along the separation surfaces or a constant or variable draft angle along only a portion of the process path and corresponding separation surfaces.

In one embodiment, the one or more optical elements are arranged so that the oblique axis 142 intersects the first axis 134 at the impingement surface such that the location of the center of the laser spot 116 is the same when the optical assembly 122 and associated optical elements are omitted. This configuration may allow for simpler programming or calculating of the process path since no offset distance between the axis 134 and the laser spot 116 need be accounted for.

Although the illustrated substrates 112 are generally flat, the laser system 100 may be configured for use with curved substrate surfaces. For example, the laser system 100 can be configured to maintain a constant oblique angle, or to otherwise control the angle of incidence α, with respect to a curved entry surface 120. Where the surface 120 is curved, the angle of incidence α is measured and controlled with respect to a surface normal where the impingement axis 142 intersects the surface 120. In such cases, the substrate 112 and/or optical assembly 122 may be moved away from or toward each other accordingly to maintain a desired focal region or focal length.

It may be desirable to minimize the angle of incidence. As may be apparent from FIG. 3, a smaller angle of incidence allows the first and second optical elements 128, 130 to be spaced closer together without the third portion 140 of the beam 114 impinging the first optical element 128 in the particularly illustrated configuration, allowing for a smaller packaging envelope for the optical elements. In embodiments including the above-described optical element rotation, another benefit of minimized spacing between the first and second optical elements is a reduced moment of inertia, requiring less force or torque to accomplish rotation since a higher portion of the mass of the assembly is located near the rotational axis in that case.

Another consideration for the angle of incidence α is the type of substrate material being processed. For instance, a transparent substrate typically has a refractive index different from that of air, causing refraction at the interface where the refractive index changes (i.e., impingement surface 120). The resulting angle of the light travelling through the substrate is thus different from the angle of incidence. For instance, with certain types of glass, an angle of incidence of about 12 degrees can result in laser-induced channels through the thickness of the glass that form a draft angle from 5 to 7 degrees. Thus, where a particular draft angle is desired, the optical properties of the substrate should be considered.

The angle of incidence α has also been found to affect formation of laser-induced channels through the thickness of the substrate. For instance, laser-induced channels formed at an oblique angle must have a greater length to fully extend between the opposite substrate surfaces. If the laser system is optimized or otherwise configured to form laser-induced channels through a substrate having a particular thickness, angled laser-induced channels may not extend completely between the opposite surfaces of the substrate, and an increasing angle of incidence may result in less complete laser-induced channels.

FIG. 4 illustrates another example of an arrangement of optical elements configured to direct the laser beam 114 toward the substrate 112 so that it impinges the substrate surface 120 at an oblique angle. In this example, a single optical element 130' (other than the focusing lens 144) is provided in the form of an elongated mirror or other type of reflector. The optical element 130' may be part of the optical assembly 122 of the laser control device 108 as shown, or part of some other component or subassembly of the laser system 100.

The first portion 132 of the laser beam 114 is received along the receiving axis 134 by the optical element 130', which operates to change the direction of the laser beam 114 so that it travels toward the substrate 112 the impingement axis 142, which forms an oblique angle with the substrate surface 120. The laser beam 114 impinges the substrate surface 120 at an angle of incidence α after passing through the focusing lens 144. The discussion of the angle of incidence and its advantages, effects, and relationships to other process parameters generally applies to the embodiment of FIG. 4 as well.

Similar to the arrangement of FIG. 3, the laser beam 114 is reflected by the elongated mirror 130' such that the angle between the received portion of the beam and the mirror is equal to the angle between the reflected portion of the beam and the mirror. In the example of FIG. 4, the laser beam impinges the mirror 130' at an angle of (α/2) degrees and thus changes the direction of the beam by the desired angle of incidence α. For instance, where it is desired to impinge the substrate surface 120 at an angle of incidence of 12 degrees, the reflective surfaces of the mirror 130' is tilted with respect to the beam axis 134 by 6 degrees.

Though the figures are not necessarily to scale, it is apparent that the embodiment depicted in FIG. 4 requires a larger mirror than the mirrors depicted in FIG. 3 for the same size laser beam, as the beam impinges a much larger area of the mirror 130' at such a shallow impingement angle. However, this embodiment requires only a single mirror in the optical assembly 122 and may have smaller x- and y-dimensions, along with a lower moment of inertia about an axis of rotation in embodiments configured so that the optical element rotates about the axis of rotation.

FIG. 5 illustrates another example of an arrangement of optical elements configured to direct the laser beam 114 toward the substrate 112 so that it impinges the substrate surface 120 at an oblique angle. In this example, a single optical element 130" (other than the focusing lens 144) is provided in the form of a prism. The prism 130" may be part of the optical assembly 122 of the laser control device 108 as shown, or part of some other component or subassembly of the laser system 100.

The first portion 132 of the laser beam 114 is received along the receiving axis 134 by the prism 130", which operates to change the direction of the laser beam 114 so that it travels toward the substrate 112 along impingement axis 142, which forms an oblique angle with the substrate surface 120. The laser beam 114 impinges the substrate surface 120 at an angle of incidence α after passing through the focusing lens 144. The discussion of the angle of incidence and its advantages, effects, and relationships to other process parameters generally applies to the embodiment of FIG. 5 as well.

In this arrangement, the angle between the receiving axis and the impingement axis is a function of the refractive index of the prism material and the angle of the prism surfaces through which the beam 114 passes according to Snell's law applied at the receiving and directing surfaces 150, 152 of the prism. Though not shown explicitly in FIG. 5, the impingement axis may be in a different direction than a central axis of the laser beam as the beam travels through the prism, depending on the angle of the beam with the surface 152. In the example of FIG. 5, the laser beam impinges the prism 130" at an angle β with respect to the receiving axis, travels through the prism at an angle determined by Snell's law, and exits the prism at the oblique angle of incidence α.

Though the figures are not necessarily to scale, it may be apparent that the embodiment depicted in FIG. 5 may be packaged in a smaller space than embodiments that rely on mirrors for beam redirection. For instance, the illustrated prism redirects the beam by a similar amount as the elongated mirror of FIG. 4 but does so in a short distance in the z-direction while also requiring less space in the x- and y-directions than the dual mirrors of FIG. 3. The prism 130" may also have a lower moment of inertia about an axis of rotation in embodiments configured so that the optical element rotates about the axis of rotation, with the mass of the prism potentially more balanced about the axis of rotation than mirror-type optical elements.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A laser system configured to form laser-induced channels in a substrate at a plurality of spaced apart locations along a process path, the laser system comprising:
    a laser that produces a laser beam; and
    a laser delivery assembly comprising a base and an optical assembly that moves relative to the base;
    wherein the base supports the substrate and the optical assembly receives the laser beam along a receiving axis and directs the laser beam toward the substrate along an impingement axis that forms an oblique angle with a surface of the substrate such that a separation surface having a draft angle is formed along the process path when the substrate is separated into a first portion and a second portion defined on opposite sides of the process path;
    wherein the optical assembly includes a first mirror positioned to receive the laser beam along the receiving axis and a second mirror positioned to receive the laser beam from the first mirror and direct the laser beam along the impingement axis; and
    wherein the first mirror has a first reflective surface and the second mirror has a second reflective surface that is non-parallel with the first reflective surface of the first mirror such that the second mirror receives the laser beam at a different angle than the first mirror.

2. The laser system as defined in claim 1, wherein the oblique angle is greater than 1 degree.

3. The laser system as defined in claim 1, wherein the second mirror receives the laser beam from the first mirror at an angle in a range from 1 to 25 degrees.

4. The laser system as defined in claim 1, wherein the optical assembly of the laser delivery assembly comprises a prism that receives the laser beam along the receiving axis and directs the laser beam along the impingement axis.

5. The laser system as defined in claim 1, wherein the laser delivery assembly comprises an optical element that directs the laser beam along the impingement axis, the optical element being configured to rotate about the receiving axis and the oblique angle being constant along a curvilinear process path.

6. The laser system as defined in claim 1, wherein the laser delivery assembly comprises an optical element that directs the laser beam along the impingement axis, the optical element being configured to rotate about the receiving axis and the oblique angle varying along the process path.

7. The laser system as defined in claim 1, wherein the surface of the substrate is curved and the oblique angle is generally constant along the process path with respect to a surface normal where the impingement axis intersects the substrate surface.

8. A method of dividing a substrate into separate first and second portions, the method comprising the steps of:
    directing a laser beam from a moving optical assembly toward the substrate, wherein the moving optical assembly includes at least one optical element positioned to receive the laser beam at an angle in a range from 1 to 25 degrees;
    impinging a surface of the substrate with the laser beam at an oblique angle, the laser beam being a pulsed laser beam configured to form a plurality of spaced-apart laser-induced channels in the substrate along a process path, wherein the first portion and the second portion are on opposite sides of the process path; and
    separating the substrate along the plurality of spaced-apart laser-induced channels, thereby forming separation surfaces having a draft angle along edges of the separated first and second portions.

9. The method of claim 8, wherein an outer perimeter of one of the portions lies within an outer perimeter of the substrate before the step of separating.

10. The method of claim 8, further comprising the steps of:
    receiving the laser beam at an optical element of the optical assembly along a receiving axis; and
    directing the laser beam along an impingement axis that forms the oblique angle with the substrate surface.

11. The method of claim 10, wherein the step of directing the laser beam along the impingement axis includes directing the laser beam from the same optical element in the step of receiving.

12. The method of claim 10, wherein the optical element is a mirror.

13. The method of claim 10, wherein the optical element is a prism.

14. The method of claim 10, wherein the step of directing the laser beam along the impingement axis includes directing the laser beam from a different optical element.

15. The method of claim 14, wherein the optical elements are non-parallel mirrors.

16. The method of claim 8, wherein the process path is curvilinear, the method further comprising the step of maintaining the oblique angle at a constant value along a curved portion of the curvilinear path.

17. The method of claim 16, wherein the step of maintaining the oblique angle comprises rotating an optical element about an axis that is normal to the substrate surface.

18. The method of claim 8, further comprising the step of moving the substrate and a laser spot relative to each other at a constant speed along the process path, the laser spot being located at the intersection of the impingement axis and the substrate surface.

19. A laser system configured to form laser-induced channels in a substrate at a plurality of spaced apart locations along a process path, the laser system comprising:
- a laser that produces a laser beam; and
- a laser delivery assembly comprising a base and an optical assembly that moves relative to the base;
- wherein the base supports the substrate and the optical assembly receives the laser beam along a receiving axis and directs the laser beam toward the substrate along an impingement axis that forms an oblique angle with a surface of the substrate such that a separation surface having a draft angle is formed along the process path when the substrate is separated into a first portion and a second portion defined on opposite sides of the process path; and
- wherein the optical assembly includes a single mirror positioned to receive the laser beam along the receiving axis and direct the laser beam along the impingement axis.

20. The laser system of claim 19, wherein the single mirror receives the laser beam at an angle in a range from 1 to 25 degrees.

\* \* \* \* \*